(Model.)

J. McANESPEY.
Cover for Coffee Pots.

No. 242,953.

Patented June 14, 1881.

WITNESSES:

INVENTOR:

ATTORNEYS.

UNITED STATES PATENT OFFICE.

JOHN McANESPEY, OF PHILADELPHIA, PENNSYLVANIA.

COVER FOR COFFEE-POTS.

SPECIFICATION forming part of Letters Patent No. 242,953, dated June 14, 1881.

Application filed April 13, 1881. (Model.)

*To all whom it may concern:*

Be it known that I, JOHN McANESPEY, of the city and county of Philadelphia, and State of Pennsylvania, have invented a new and Improved Cover for Coffee-Pots, of which the following is a full, clear, and exact description.

My invention consists in providing the cover with a perforation, which perforation is covered by a housing containing a ball, which acts as an automatic valve for retaining the aroma of the coffee and for admitting air to the pot while pouring the coffee.

Figure 1:
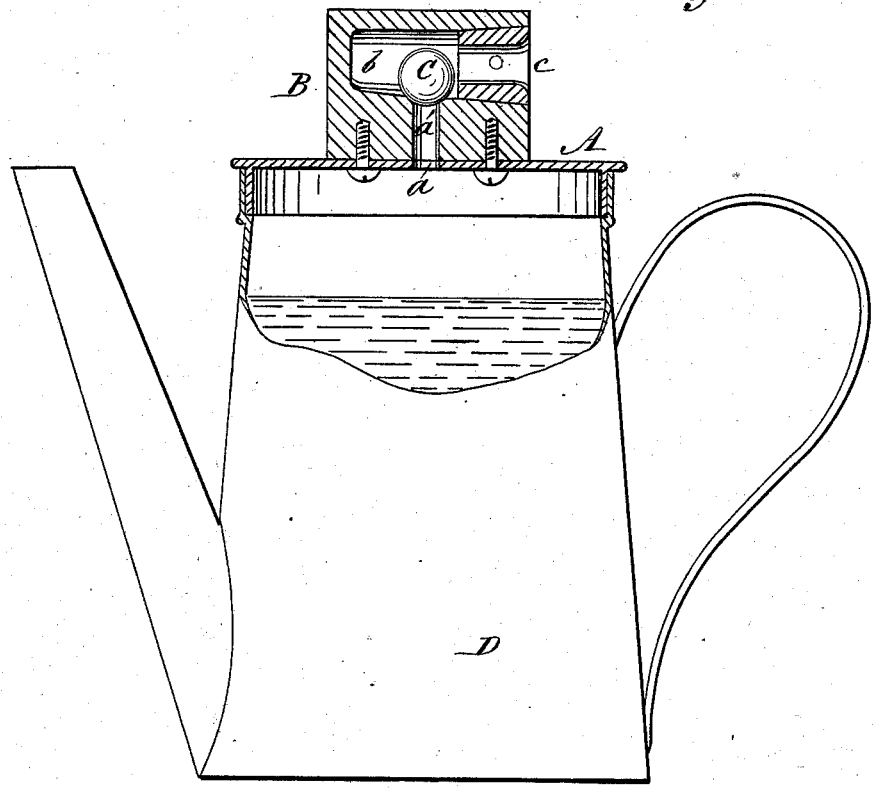
Figure 2:
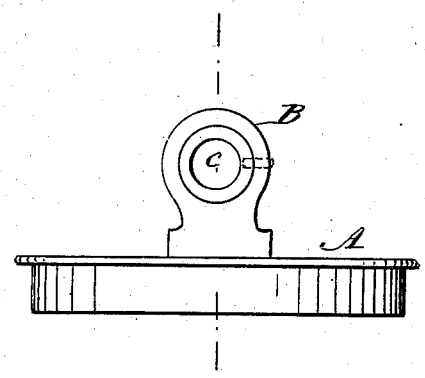

In the accompanying drawings, Figure 1 is a sectional view of my invention, and Fig. 2 is an elevation thereof.

Similar letters of reference indicate corresponding parts.

A represents the cover proper, which is perforated in the center with the hole $a$; and B represents the block or housing, which is formed with the vertical hole $a'$, which registers with the hole $a$ in the cover, and also with the large horizontal chamber $b$, the outer end of which is partially closed to form the smaller opening or orifice $c$. The chamber $b$ contains the ball C, and the bottom or floor of the chamber is inclined toward the orifice $c$, so that when the coffee-pot D, upon which the cover is placed, is upright the ball will close the hole $a'$ and prevent the escape of the flavor and aroma of the coffee; but when the pot is tilted for pouring the coffee the ball C will roll away to the front of the chamber and admit air through the orifice $c$ and holes $a$ and $a'$ into the interior of the pot. The housing-block serves also as a handle for the cover, and the cover should always be placed upon the pot with the closed end of the housing toward the spout of the pot.

Having thus described my invention, I claim as new and desire to secure by Letters Patent—

The coffee-pot cover herein shown and described, for retaining the strength and aroma of the coffee and for admitting air to the pot during pouring, consisting of the cover proper, A, provided with the perforation $a$, and the chambered block B, provided with the ball-valve C, and formed with the openings $a$ and $c$, substantially as described.

JOHN McANESPEY.

Witnesses:
E. J. McANESPEY,
ELLEN McANESPEY.